US012316369B2

(12) United States Patent
Thompson

(10) Patent No.: US 12,316,369 B2
(45) Date of Patent: *May 27, 2025

(54) FAST ANTENNA SWITCHING

(71) Applicant: SKYWORKS SOLUTIONS, INC., Irvine, CA (US)

(72) Inventor: Robert John Thompson, Cedar Rapids, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,245

(22) Filed: Apr. 5, 2023

(65) Prior Publication Data
US 2023/0239000 A1  Jul. 27, 2023

Related U.S. Application Data

(63) Continuation of application No. 16/991,851, filed on Aug. 12, 2020, now Pat. No. 11,652,504.

(60) Provisional application No. 62/885,997, filed on Aug. 13, 2019.

(51) Int. Cl.
*H04L 12/00* (2006.01)
*H04B 1/44* (2006.01)
*H04L 5/14* (2006.01)

(52) U.S. Cl.
CPC .............. *H04B 1/44* (2013.01); *H04L 5/14* (2013.01)

(58) Field of Classification Search
CPC .................................. H04B 1/44; H04L 5/14
See application file for complete search history.

(56) References Cited

U.S. PATENT DOCUMENTS

| 2019/0097715 A1* | 3/2019 | Maldonado | ......... H04B 7/0814 |
| 2019/0288728 A1* | 9/2019 | Bai | .......................... H04B 1/44 |
| 2020/0059208 A1* | 2/2020 | Yang | ..................... H04B 1/525 |
| 2021/0211265 A1* | 7/2021 | Xu | ........................ H03F 3/245 |

* cited by examiner

*Primary Examiner* — Noel R Beharry
*Assistant Examiner* — Lionel Preval
(74) *Attorney, Agent, or Firm* — Chang & Hale LLP

(57) ABSTRACT

Circuits, devices, and methods related to setting a drive power of a power amplifier to a first power level, switching an input of the power amplifier to an isolation state, switching an antenna selection state of an antenna network, and switching the input of the power amplifier to an active state.

19 Claims, 6 Drawing Sheets

FAST ANTENNA SWITCHING

CROSS-REFERENCE TO RELATED APPLICATION

This application is a continuation of U.S. application Ser. No. 16/991,851 filed Aug. 12, 2020 and entitled "FAST ANTENNA SWITCHING," which claims priority to U.S. Provisional Application No. 62/885,997 filed Aug. 13, 2019, entitled FAST ANTENNA SWITCHING, the disclosure of which is hereby expressly incorporated by reference herein in its respective entirety.

BACKGROUND

The present disclosure relates to systems and methods for antenna switching for power amplifiers and related devices.

A Sounding Reference Signal (SRS) is a reference signal that can be transmitted by a user device (e.g., a smartphone, laptop computer, tablet, etc.) and may be used to estimate channel quality. An SRS may be sent over an uplink channel. SRS switching (i.e., SRS hopping) involves switching a signal from one antenna to another.

SUMMARY

In accordance with some implementations, the present disclosure relates to a method comprising setting a drive power of a power amplifier to a first power level, switching an input of the power amplifier to an isolation state, switching an antenna selection state of an antenna network, and switching the power amplifier input to an active state.

In some embodiments, switching the input to the isolation state and switching the input to the active state are performed during a cyclic prefix portion of a symbol timing. The drive power may be maintained at the first power level during the cyclic prefix portion of the symbol timing. In some embodiments, the antenna network is able to settle during the cyclic prefix portion of the symbol timing.

Switching the input to the isolation state may terminate a transceiver power to a known impedance. In some embodiments, switching the input to the isolation state isolates the power amplifier from input power. The first power level may be above a minimal power level.

In some implementations, the present disclosure relates to a circuit comprising a transceiver, an antenna network comprising a first antenna and a second antenna, and a transmit/receive module coupled to the transceiver and the antenna network. The transmit/receive module comprises a power amplifier coupled to the transceiver, a first switch coupled between an input of the power amplifier and the transceiver, and a second switch coupled between the first switch and a ground node.

In some embodiments, the transmit/receive module further comprises a third switch coupled between an output of the power amplifier and the antenna network. The third switch may be configured to alternatively couple the output of the power amplifier to the first antenna or the second antenna. In some embodiments, the circuit further comprises a low-noise amplifier coupled to the transceiver. The transmit/receive module may further comprises a fourth switch coupled between the output of the power amplifier and the third switch and between an input of the low-noise amplifier and the third switch. The fourth switch may be configured to alternatively couple the antenna network to the output of the power amplifier or the input of the low-noise amplifier. In some embodiments, the circuit further comprises a filter coupled between the third switch and the fourth switch.

The circuit may further comprise a resistor coupled between the second switch and a ground node.

Some implementations of the present disclosure relate to a time division duplex module comprising a power amplifier, a first switch, a second switch, and coupling circuitry configured to couple the power amplifier to a transceiver, the first switch between an input of the power amplifier and the transceiver, and the second switch between the first switch and a ground node.

In some embodiments, the time division duplex module further comprises a third switch. The coupling circuitry may be further configured to couple the third switch between an output of the power amplifier and an antenna network comprising a first antenna and a second antenna.

The third switch may be configured to alternatively couple the output of the power amplifier to the first antenna or the second antenna. In some embodiments, the time division duplex module further comprises a low-noise amplifier. The coupling circuitry may be further configured to couple the low-noise amplifier to the transceiver.

In some embodiments, the time division duplex module further comprises a fourth switch. The coupling circuitry may be further configured to couple the fourth switch between the output of the power amplifier and the third switch and between an input of the low-noise amplifier and the third switch. In some embodiments, the fourth switch is configured to alternatively couple the antenna network to the output of the power amplifier or the input of the low-noise amplifier.

The time division duplex module may further comprise a resistor. The coupling circuitry may be further configured to couple the resistor between the second switch and a ground node.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DESCRIPTION

The headings provided herein, if any, are for convenience only and do not necessarily affect the scope or meaning of the claimed invention.

A Sounding Reference Signal (SRS) is a reference signal that can be transmitted by a user device (e.g., a smartphone, laptop computer, tablet, etc.) and may be used to estimate channel quality. An SRS may be sent over an uplink channel. SRS switching (i.e., SRS hopping) involves switching a signal from one antenna to another. There is a need for faster SRS switching, particularly in view of 5G New Radio (NR) studies. SRS can enhance downlink multiple-input and multiple-output (MIMO) link adaptation and beam forming by exploiting channel reciprocity. One challenge includes switching a transmission uplink signal from one antenna to a different antenna within the cyclic prefix portion of the symbol.

Some solutions may involve the following timing. First, a transceiver drive power may be turned off and/or set to a first power level. The first power level may be a minimal power level and/or may be greater than a minimal power level. Second, an antenna may be switched to a selection state. Third, the transceiver power may be turned back on to desired signal level. After the transceiver power is enabled there may be additional time to allow for a phase locked loop (PLL) to settle back to an acceptable frequency tolerance. In some cases, it can be important to reduce power amplifier output power prior to actively switching the output. This may be an important provision to keep from damaging the power amplifier or the output switch.

Figure 1:
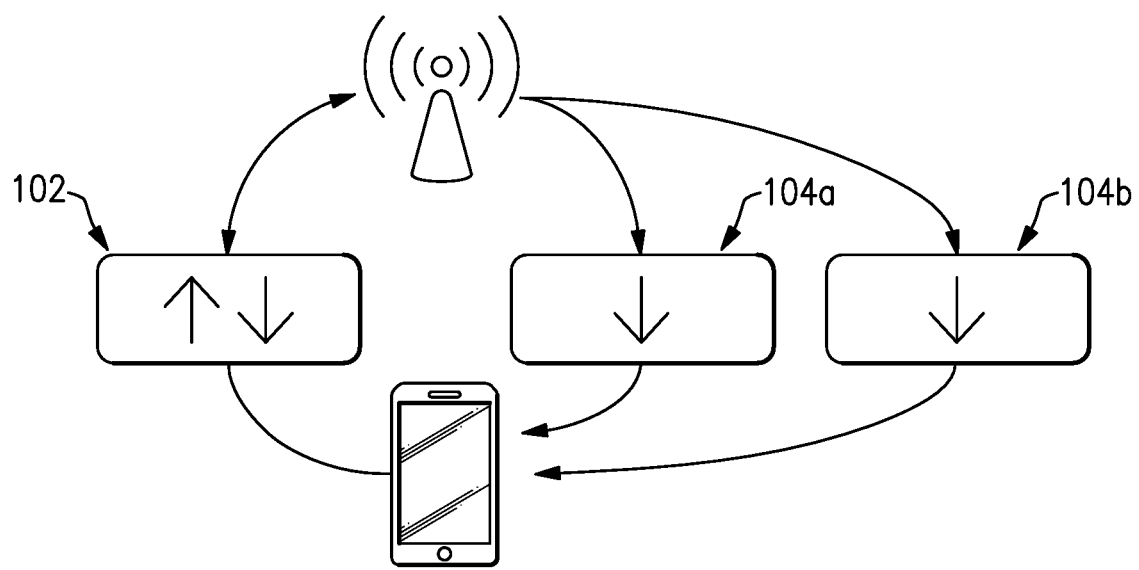
FIG. 1 illustrates various Long-Term Evolution (LTE) use-cases for Sounding Reference Signal (SRS) switching in accordance with one or more embodiments.

SRS switching provides a possibility of transmitting SRS in carriers for which the uplink may not be configured. FIG. 1 illustrates various Long-Term Evolution (LTE) use-cases for SRS switching. One use case includes time division duplex (TDD) downlink carrier aggregation (DL-CA), where only primary cells 102 may benefit from uplink transmissions. Downlink secondary cells 104a, 104b may not benefit from channel reciprocity. Another use case is frequency division duplex (FDD) LTE with a supplemental downlink (SDL) band, where similarly only primary cells 102 may benefit from uplink transmissions. In NR, smaller slot length may impact downlink/uplink (DL/UL) interruptions. In NR, bandwidth part (BWP) can re-use LTE intraband component carrier (CC) SRS switching operations.

SRS switching may advantageously allow enhancement of fast DL MIMO link adaptation and/or may enhance downlink beamforming by making better exploitation of channel reciprocity. One use case may involve high-resolution multi-user massive MIMO precoding in large antenna arrays. To fully exploit channel reciprocity, a base station (which may be referred to as gNB) may require highly accurate channel state information (CSI) between all base station transmit and receive antennae. This may allow the base station to transmit with antenna patterns that can maximize signal-to-interference-plus-noise ratio (SINR). Thus, high-resolution MIMO precoding may require frequent, wideband SRS transmissions.

Another use case may involve low-resolution single-user MIMO precoding. Single-user MIMO precoding may require less CSI (e.g., relative to multi-user MIMO) to reach desired performance. This may be due at least in part to the base station not needing to suppress interference between user equipment (UE) devices (i.e., inter-UE). UE receive diversity antennae may be sufficient to separate interference between multiple MIMO streams. SRS transmissions may accordingly be more beneficial to determine the long-term and/or wideband precoding for low-resolution single-user MIMO. This may require less frequent SRS transmissions and/or may allow for narrower SRS transmissions (e.g., relative to multi-user MIMO).

SRS switching can cause various system-level performance challenges. For example, SRS switching may lead to interruption of uplink hybrid automatic repeat request (HARD) transmissions (e.g., ACK/NACK transmission) on a primary cell due to UE switching glitches. If the SRS switching time is not fast enough, the base station might not be able to transmit a downlink physical downlink shared channel (PDSCH) at all during an SRS switch to another carrier, thereby impacting downlink throughput. Moreover, for the base station, increasing the number of antenna array elements may correlate to a narrower beamwidth. Beam patterns may also tend to become frequency-selective, potentially placing UEs within steep beam lobe nulls. Thus, UE SINR could rapidly be degraded if beamforming and MIMO precoding is/are not assisted quickly enough.

It may be desired to minimize the available power to a power amplifier input prior to actively switching any power amplifier output switching. Some embodiments described herein provide systems and/or methods for preventing turning down the transceiver power prior to the output switching and/or turning the transceiver power back to nominal values after the output switching has stabilized. Cycling the transceiver power may take up some timing from the overall timing budget and/or may shorten the allowed time for the output switching.

In some embodiments, the transceiver power may not be disabled. Rather, an isolation switch may be utilized to terminate the transceiver power into a known impedance while also isolating the power amplifier from input power. The input switching can be done quickly relative to a switch that is at a power amplifier output. Lower-power switches generally may have much faster switch times than higher-power switches. In addition, because the transceiver power may be held in a steady state, the phase-locked loop (PLL) recovery time may be very minimal. In some embodiments, additional time may be allowed for the antenna switching to settle. System timing requirements may be met to settle within the cyclic prefix portion of the symbol timing. Accordingly, such device may have faster overall timing.

Some embodiments provide methods to keep transceiver drive power held at a desired output power during a fast switching event at a power amplifier output. In some embodiments, timing may advantageously be sped up to enable fast transient switching at the power amplifier output. Some embodiments may involve methods involving dropping transceiver power to a low-level amplitude (and/or a minimum output) during a fast switching event In some cases, disadvantages of reducing transceiver drive power prior to a power amplifier output switch may include that it can require time to drop the power and subsequently raise the power back up to desired level. Moreover, the time required to cycle the power may be taken from the power amplifier switch timing budget. Accordingly, it may be desirable to minimize the available power to a power amplifier input prior to actively switching any power amplifier output switching Output switching is a transient event that can require a finite amount of time to "break" an existing connection and/or "make" a new connection. In some cases, output switching can cause a load mismatch at the output of the power amplifier. The load mismatch can result in damage to the power amplifier. The power amplifier can also potentially damage a switch configured to perform "hot" switches.

Figure 2:
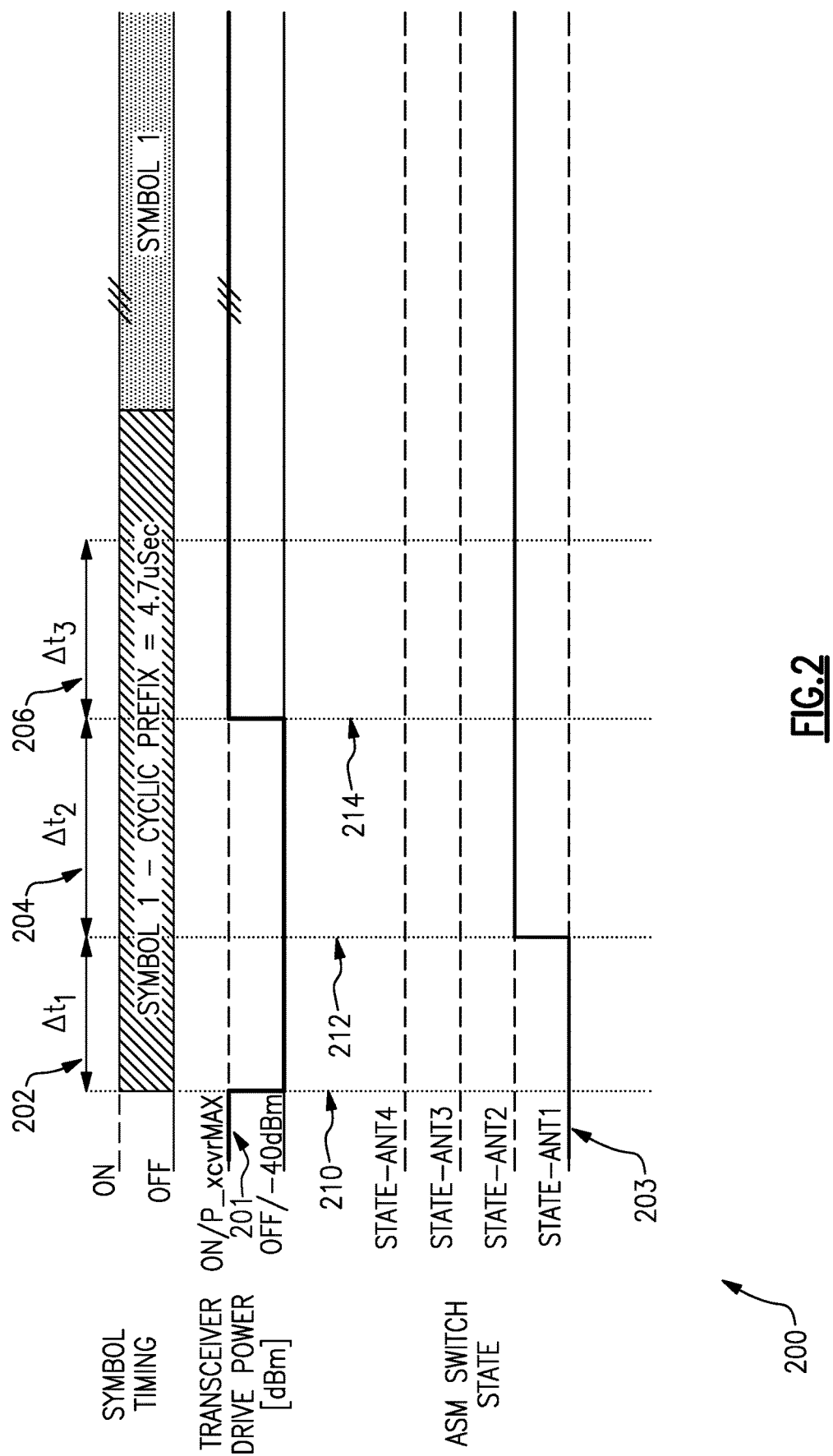
FIG. 2 provides a time diagram illustrating a baseline configuration for fast SRS switching in accordance with one or more embodiments.

FIG. 2 provides a time diagram 200 illustrating a baseline configuration for fast SRS switching. The diagram includes various time deltas associated with a power amplifier. In FIG. 2, a first time delta ($\Delta t_1$) 202 represents a time delta for disabling power off, and/or a delay time for driving power off. A second time delta ($\Delta t_2$) 204 represents a time delta and/or a delay time for driving power back on following switch re-configuration. A third time delta ($\Delta t_3$) 206 represents a switch/gain setting time after transmit power is restored.

In some embodiments, the first time delta 202, second time delta 204, and/or third time delta 206 may form at least a portion of a cyclic prefix. The cyclic prefix may have a duration of approximately 4.7 μseconds. A transceiver drive power plot 201 may correlate to drive power levels in dBm of a transceiver and an antenna switch state plot 203 may correlate to antenna configuration states of an antenna network. The drive power of the transceiver may be cycled. For example, the drive power may be switched from an ON state to an OFF state (see, e.g., transceiver drive power plot 201 at a first time position 210. In some embodiments, switching the drive power from the ON state to the OFF state may cause re-configuration at one or more antennas. For example, in response to a switch of the drive power from an ON state to an OFF state, an antenna network may switch from a first antenna to a second antenna (see, e.g., antenna switch state plot 203 at a second time position 212). The first time delta 202 may represent an amount of time between the drive power of the transceiver is switched to the OFF state and the antenna network re-configures in response to the state change.

The transceiver may return to the ON state following re-configuration of the antenna network. In some embodiments, the transceiver may return to the ON state in response to re-configuration of the antenna network. The second time delta 204 may represent an amount of time between re-configuration of the antenna network (i.e., a switch between antennas of the antenna network) and a change from the OFF state to the ON state of the transceiver. The re-configuration of the antenna network may occur at the second time position 212 and the transceiver may switch to the ON state at a third time position 214. In some embodiments, the second time delta 204 may be greater than and/or approximately equal to the first time delta 202.

After the transceiver switches from the ON state to the OFF state, various measurements/devices associated with the power amplifier may require some amount of time to settle. For example, the third time delta 206 may represent a period of time that gain values may require to settle.

Figure 3:
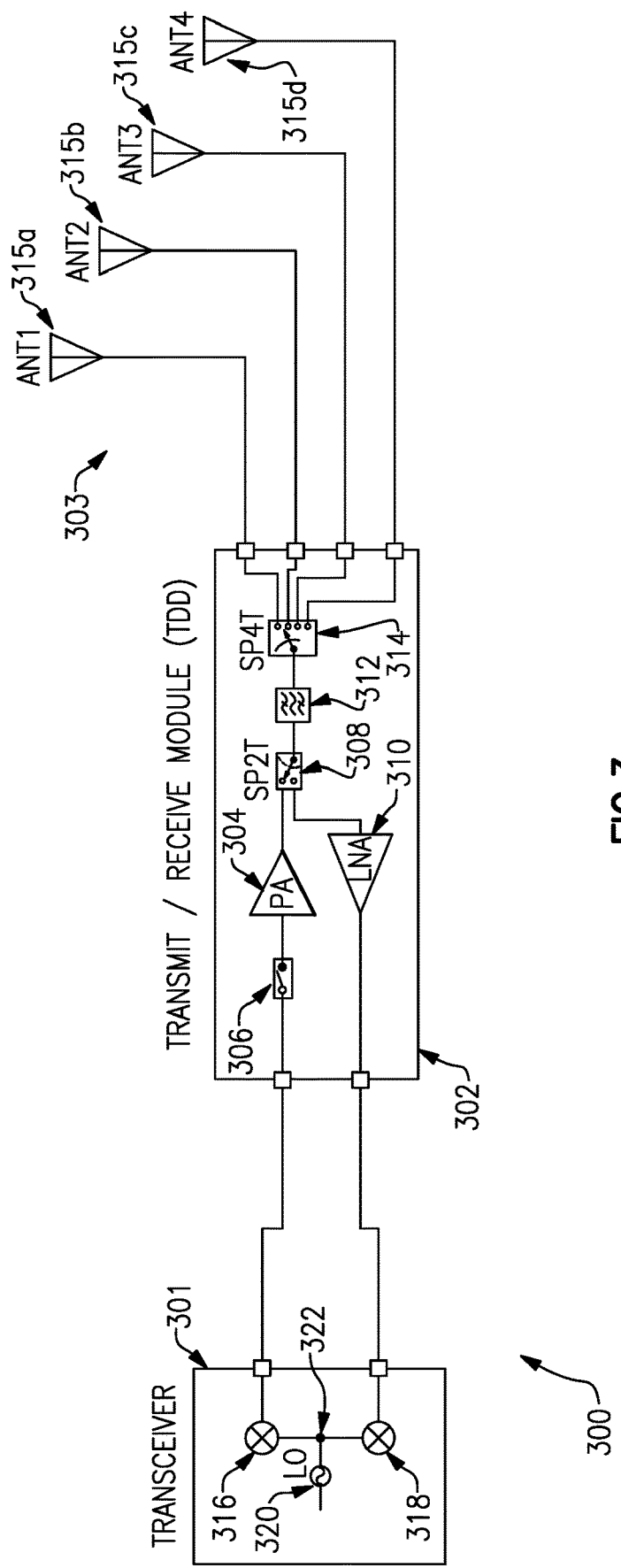
FIG. 3 provides a circuit for performing the baseline configuration in accordance with one or more embodiments.

FIG. 3 provides a circuit 300 for performing the baseline configuration. In some embodiments, the circuit 300 may comprise a transmit/receive module such as a time division duplex (TDD) 302. The TDD 302 may comprise a power amplifier 304 coupled between a first switch 306 and a second switch 308 (e.g., an RF switch and/or a single-pole double-throw (SP2T or SPDT) switch). The second switch 308 may be configured to receive an input (e.g., a single input) from an antenna network 303 and/or can connect to and/or switch between outputting to the power amplifier 304 and a low-noise amplifier (LNA) 310. A filter 312 (e.g., a band-pass filter (BPF)) may be situated between the antenna network 303 and the second switch 308. In some embodiments, the antenna network 303 may comprise multiple antennas 315. For example, the antenna network 303 may comprise four antennas: a first antenna 315a, a second antenna 315b, a third antenna 315c, and a fourth antenna 315d. Each antenna 315 may connect to a third switch 314 (e.g., a single-pole four-throw (SP4T) switch) coupled between the antenna network 303 and the filter 312 and/or second switch 308. In some embodiments, the third switch 314 may be configured to determine which antenna 315 provides an input to the second switch 308. For example, a single antenna 315 at a time may be coupled to the filter 312 and/or the second switch and may provide a single input to the second switch 308. Moreover, the second switch 308 may be configured to couple the single input to the power amplifier 304 or the LNA 310.

In some embodiments, the TDD 302 may be coupled to a transceiver 301. For example, the transceiver may be coupled to the first switch 306 to provide an input (e.g., an RF input) to the TDD 302. Moreover, the transceiver 301 may be coupled to the LNA 310. For example, the LNA 310 may be configured to provide an output to the transceiver 301. In some embodiments, the transceiver 301 may comprise a first mixer 316 coupled to the TDD 302 (e.g., the first switch 306) and/or to a second mixer 318 of the transceiver 301 and/or an oscillator 320 (e.g., a local oscillator (LO)) of the transceiver 301. The oscillator 320, first mixer 316 and/or second mixer 318 may be coupled to a first node 322.

The first switch 306 may provide an input to the power amplifier 304 and the power amplifier 304 may output to the second switch 308. Moreover, the second switch 308 may provide an input to the LNA 310 and/or the LNA 310 may output to the transceiver 301.

Figure 4:
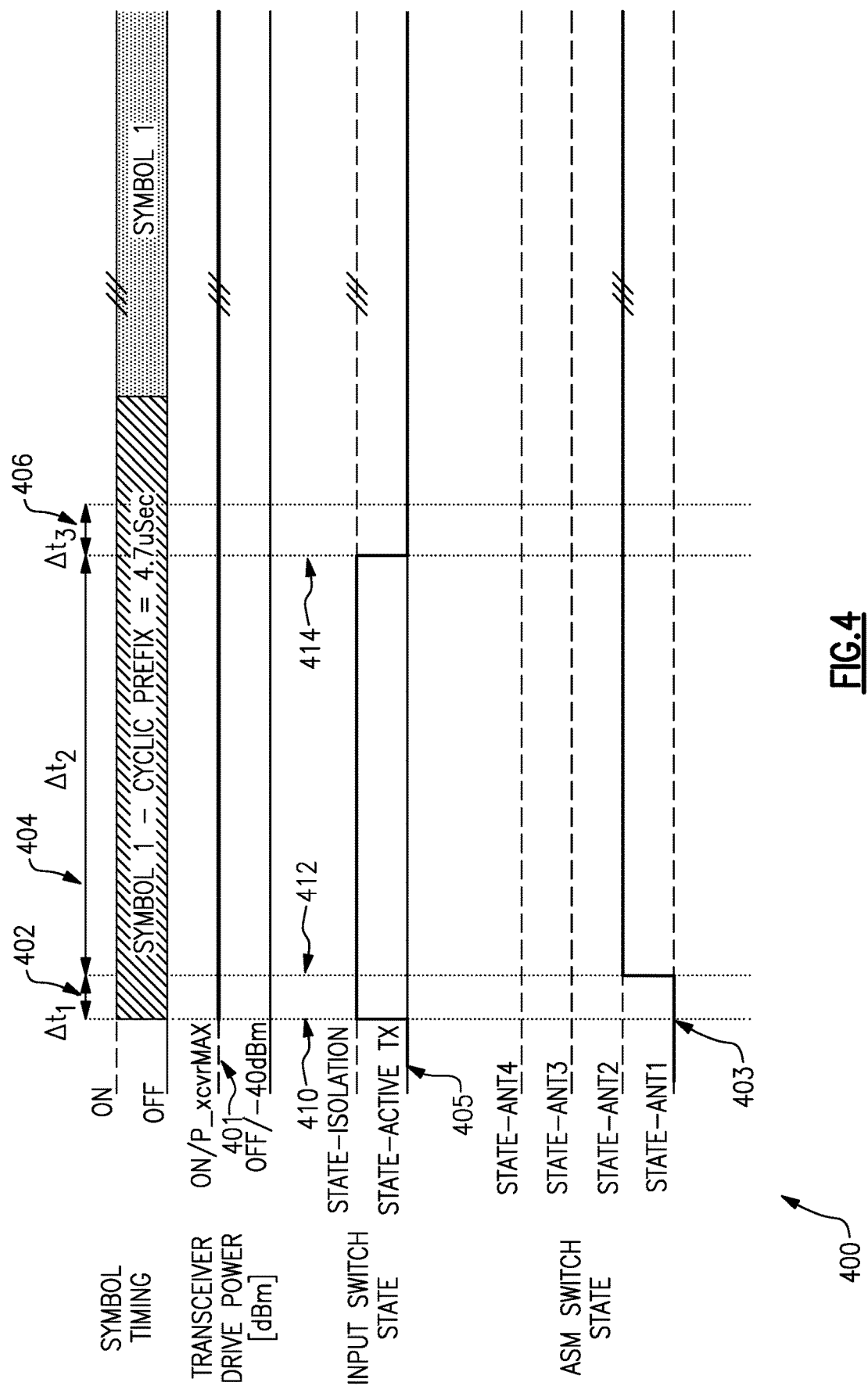
FIG. 4 provides a diagram illustrating improved fast SRS switching timing in accordance with one or more embodiments.

FIG. 4 provides a diagram illustrating improved fast SRS switching timing. The diagram includes various time deltas. In FIG. 4, a first time delta ($\Delta t_1$) 402 represents a delay time for a power amplifier input switch to an isolated state. A second time delta ($\Delta t_2$) 404 represents a delay time for post power amplifier switch/gain settling time. A third time delta ($\Delta t_3$) 406 represents a delay time for input switch to an active transmit state.

In some embodiments, the first time delta 402, second time delta 404, and/or third time delta 406 may form at least a portion of a cyclic prefix. The cyclic prefix may have a duration of approximately 4.7 μseconds. A transceiver drive power plot 401 may correlate to drive power levels in dBm of a transceiver, an antenna switch state plot 403 may correlate to antenna configuration states of an antenna network, and an input switch plot 405 may correlate input switch states (e.g., for a transmit/receive module). The input switch state may be cycled. For example, the input state may be switched from an active transmission state to an isolation state (see, e.g., input switch state plot 401 at a first time position 410). In some embodiments, switching the input state from the active transmission state to the isolation state may cause re-configuration at one or more antennas. For example, in response to a switch of the input from the active transmission state to the isolation state, an antenna network may switch from a first antenna to a second antenna (see, e.g., antenna switch state plot 403 at a second time position 412). The first time delta 402 may represent an amount of time between the input state being switched to the isolation state and the antenna network re-configuring in response to the state change.

Following the input switch to the isolation state and/or re-configuration of the antenna network, the power amplifier may require a period of time for switch/gain settling. The second time delta 404 may represent the settling time for the power amplifier.

The input may return to the active transmission state following re-configuration of the antenna network. In some embodiments, the input may return to the active transmission state in response to re-configuration of the antenna network. The second time delta 404 may represent an amount of time between re-configuration of the antenna network (i.e., a switch between antennas of the antenna network) and a change from the isolation state to the active transmission state of the power amplifier input. The re-configuration of the antenna network may occur at the second time position 412 and the input may switch to the active transmission state at a third time position 414. In some embodiments, the second time delta 404 may be greater than the first time delta 402.

After the input switches from the isolation state to the active transmission state, there may be a delay period for the switch to impact the power amplifier. The third time delta 406 may represent the delay time for the input switch to the active transmission state.

In some embodiments, the transceiver drive power may be maintained in an ON state during and/or after the cyclic prefix (e.g., during the first time delta, second time delta 404, and third time delta 406). In other words, transceiver power may not be disabled at any point before or after re-configuration of the antenna network (e.g., switching from one antenna to another). By maintaining the drive power in the ON state, the power amplifier advantageously does not use a portion of the timing budget for cycling the transceiver power and/or may shorten the allowed and/or required time for output switching.

Rather than cycling the transceiver drive power, switching the input state to the isolation state may terminate the transceiver power into a known impedance and/or may isolate the power amplifier from the input power. Thus, input switching may be performed relatively quickly relative to a switch at the power amplifier output. Moreover, because the transceiver power is held at a steady state, the PLL recovery time may be minimal. Furthermore, by switching the input state, the power amplifier may have sufficient settling time (e.g., the second time delta 404) while meeting system timing requirements to settle within the cyclic prefix portion of the symbol timing.

Figure 5:
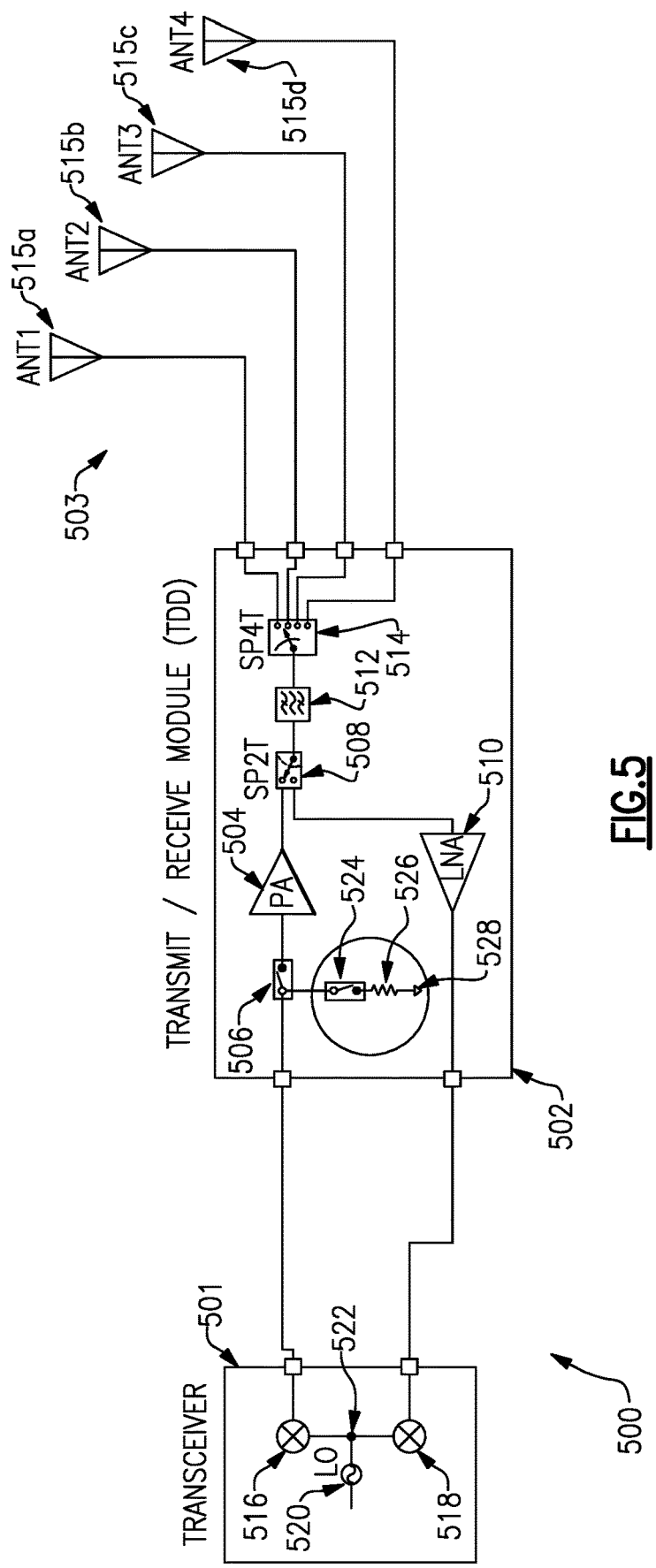
FIG. 5 provides a circuit for performing the improved fast SRS switching configuration in accordance with one or more embodiments.

FIG. 5 provides a circuit 500 for performing the improved fast SRS switching configuration. In some embodiments, the circuit 500 may comprise a transmit/receive module such as a time division duplex (TDD) 502. The TDD 502 may comprise a power amplifier 504 coupled between a first switch 506 and a second switch 508 (e.g., an RF switch and/or a single-pole double-throw (SP2T or SPDT) switch). The second switch 508 may be configured to receive an input (e.g., a single input) from an antenna network 503 and/or can connect to and/or switch between outputting to the power amplifier 504 and a low-noise amplifier (LNA) 510. A filter 512 (e.g., a band-pass filter (BPF)) may be situated between the antenna network 503 and the second switch 508. In some embodiments, the antenna network 503 may comprise multiple antennas 515. For example, the antenna network 503 may comprise four antennas: a first antenna 515a, a second antenna 515b, a third antenna 515c, and a fourth antenna 515d. Each antenna 515 may connect to a third switch 514 (e.g., a single-pole four-throw (SP4T) switch) coupled between the antenna network 503 and the filter 512 and/or second switch 508. In some embodiments, the third switch 514 may be configured to determine which antenna 515 provides an input to the second switch 508. For example, a single antenna 515 at a time may be coupled to the filter 512 and/or the second switch and may provide a single input to the second switch 508. Moreover, the second switch 508 may be configured to couple the single input to the power amplifier 504 or the LNA 510. Various coupling circuitry may be used to interconnect the various components of the circuit 500.

In some embodiments, the TDD 502 may be coupled to a transceiver 501. For example, the transceiver may be coupled to the first switch 506 to provide an input (e.g., an RF input) to the TDD 502. Moreover, the transceiver 501 may be coupled to the LNA 510. For example, the LNA 510 may be configured to provide an output to the transceiver 501. In some embodiments, the transceiver 501 may comprise a first mixer 516 coupled to the TDD 502 (e.g., the first switch 506) and/or to a second mixer 518 of the transceiver 501 and/or an oscillator 520 (e.g., a local oscillator (LO)) of the transceiver 501. The oscillator 520, first mixer 516 and/or second mixer 518 may be coupled to a first node 522.

The first switch 506 may provide an input to the power amplifier 504 and the power amplifier 504 may output to the second switch 508. Moreover, the second switch 508 may provide an input to the LNA 510 and/or the LNA 510 may output to the transceiver 501.

In some embodiments, a fourth switch 524 may be coupled between first switch 506 and a resistor 526. The resistor 526 may further be coupled between the fourth switch 524 and a ground node 528.

Figure 6:
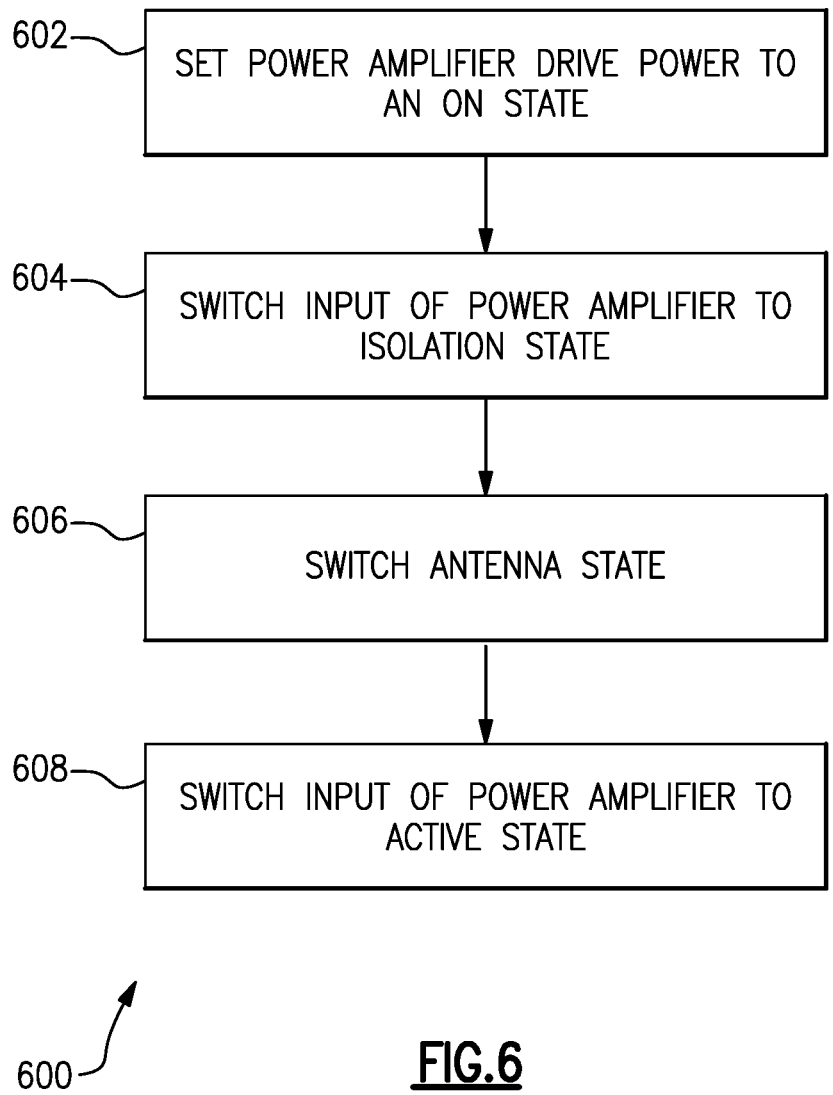
FIG. 6 provides a flowchart of an example process for fast antenna switching in accordance with one or more embodiments.

FIG. 6 provides a flowchart of an example process 600 for fast antenna switching. At block 602, the process 600 involves setting a power amplifier drive power to an ON and/or non-minimal state. In other words, a transceiver power provided to the power amplifier may not be disabled and/or otherwise impacted. The power amplifier may be set to a first power level during the ON state. The first power level may be any desired power level. In some embodiments, the power level at the power amplifier may be maintained and/or held at a steady state during an entire cyclic prefix portion of a symbol timing.

At block 604, the process 600 involves switching an input of the power amplifier to an isolation state. In some embodiments, switching the input of the power amplifier to the isolation state may involve use of and/or closing of an isolation switch coupled in parallel with the input of the power amplifier and/or the transceiver input power. The isolation switch may be coupled to a ground node and/or may be configured to terminate the transceiver power to a known impedance and/or to isolate the power amplifier from the input power provided by the transceiver. The input power from the transceiver may be held at a steady state but may be isolated from the power amplifier by the isolation switch.

At block 606, the process 600 involves switching an antenna selection state of an antenna network coupled to the power amplifier. In some embodiments, the antenna network may comprise at least two antennas. A switch may be used to alternatively select an antenna of the antenna network that may be coupled to the power amplifier and/or other device. Switching the antenna state may involve disconnecting a first antenna of the antenna network from the power amplifier and/or other device and connecting a second antenna of the antenna network to the power amplifier and/or other device. In some embodiments, the antenna state may be switched during the cyclic prefix portion of the symbol timing. The input power may be maintained at a non-minimal level during the antenna state switch.

At block 608, the process 600 involves switching the input of the power amplifier to an active transmission state. In some embodiments, switching the input of the power amplifier to the active transmission state may involve opening the isolation switch to prevent isolation of the power amplifier. The input may be switched to the active state during the cyclic prefix portion of the symbol timing.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
setting a drive power of a power amplifier to a first power level, the power amplifier connected to a transceiver through a first switch; switching the first switch to an on state to isolate the power amplifier from input power provided by the transceiver, the first switch, an input of the power amplifier, and the transceiver being directly coupled at a first node; switching an antenna selection state of an antenna network connected to an output of the power amplifier while the first switch is in the on state, the antenna network comprising a first antenna and a second antenna; and switching the first switch to an off state to reconnect the power amplifier to the input power provided by the transceiver and a second switch is coupled between an output of the power amplifier and the antenna network, the second switch being configured to switch from the first antenna to the second antenna while the first switch is in the on state.

2. The method of claim 1 wherein the first switch is directly connected to a ground node.

3. The method of claim 1 wherein switching the first switch to the on state and switching the first switch to the off state are performed during a cyclic prefix portion of a symbol timing.

4. The method of claim 3 wherein the drive power is maintained at the first power level during the cyclic prefix portion of the symbol timing.

5. The method of claim 3 wherein the antenna network is able to settle during the cyclic prefix portion of the symbol timing.

6. The method of claim 1 wherein the first power level is above a minimal power level.

7. A circuit comprising:
a transceiver;
an antenna network comprising a first antenna and a second antenna; and
a transmit/receive module connected between the transceiver and the antenna network and directly connected to the antenna network, the transmit/receive module comprising a power amplifier coupled to the transceiver; a first switch configured to switch to an on state to isolate the power amplifier from input power provided by the transceiver and configured to switch to an off state to reconnect the power amplifier to the input power provided by the transceiver, the power amplifier being coupled to the transceiver through the first switch, the first switch, an input of the power amplifier, and the transceiver being directly coupled at a first node; and a second switch coupled between an output of the power amplifier and the antenna network and configured to switch from the first antenna to the second antenna while the first switch is in the on state.

8. The circuit of claim 7 wherein the second switch is configured to alternatively couple the output of the power amplifier to the first antenna or the second antenna.

9. The circuit of claim 7 wherein the transmit/receive module further comprises a resistor directly connected between the first switch and a ground node.

10. The circuit of claim 7 wherein switching the first switch to the on state and switching the first switch to the off state are performed during a cyclic prefix portion of a symbol timing.

11. The circuit of claim 7 wherein the transmit/receive module further comprises a low-noise amplifier directly connected to the transceiver.

12. The circuit of claim 11 wherein the transmit/receive module further comprises a third switch directly connected between the output of the power amplifier and the second switch and between an input of the low-noise amplifier and the second switch, the third switch configured to alternatively couple the antenna network to the output of the power amplifier or the input of the low-noise amplifier.

13. The circuit of claim 12 wherein the transmit/receive module further comprises a filter directly connected between the second switch and the third switch.

14. A time division duplex module comprising:
a transceiver;
an antenna network comprising a first antenna and a second antenna; and
a transmit/receive module connected between the transceiver and the antenna network and directly connected to the antenna network, the transmit/receive module comprising a power amplifier coupled to the transceiver; a first switch configured to switch to an on state to isolate the power amplifier from input power provided by the transceiver and configured to switch to an off state to reconnect the power amplifier to the input power provided by the transceiver, the power amplifier being coupled to the transceiver through the first switch, the first switch, an input of the power amplifier, and the transceiver being directly coupled at a first node; and a second switch coupled between an output of the power amplifier and the antenna network and configured to switch from the first antenna to the second antenna while the first switch is in the on state.

15. The time division duplex module of claim 14 wherein the second switch is configured to alternatively couple the output of the power amplifier to the first antenna or the second antenna.

16. The time division duplex module of claim 14 wherein the transmit/receive module further comprises a low-noise amplifier directly connected to the transceiver.

17. The time division duplex module of claim 16 wherein the transmit/receive module further comprises a third switch directly connected between the output of the power amplifier and the second switch and between an input of the low-noise amplifier and the second switch, the third switch configured to alternatively couple the antenna network to the output of the power amplifier or the input of the low-noise amplifier.

18. The time division duplex module of claim 17 wherein the transmit/receive module further comprises a filter directly connected between the second switch and the third switch.

19. The time division duplex module of claim 14 wherein the transmit/receive module further comprises a resistor directly connected between the first switch and a ground node.

* * * * *